US012412993B1

(12) United States Patent
Yang et al.

(10) Patent No.: US 12,412,993 B1
(45) Date of Patent: Sep. 9, 2025

(54) GERMANIUM TELLURIDE-BASED REFLECTARRAY ELEMENT AND MILLIMETER-WAVE FREQUENCY-RECONFIGURABLE REFLECTARRAY ANTENNA

(71) Applicant: Nanjing University of Aeronautics and Astronautics, Nanjing (CN)

(72) Inventors: Wanchen Yang, Nanjing (CN); Shilong Pan, Nanjing (CN); Xiangchuan Wang, Nanjing (CN); Lihan Wang, Nanjing (CN); Jinghao Li, Nanjing (CN); Li Wei, Nanjing (CN); Wenquan Che, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 0 days.

(21) Appl. No.: 19/248,522

(22) Filed: Jun. 25, 2025

(30) Foreign Application Priority Data

Dec. 2, 2024 (CN) ........................ 202411745264.X

(51) Int. Cl.
*H01Q 15/14* (2006.01)
*H01Q 1/38* (2006.01)
*H01Q 5/50* (2015.01)

(52) U.S. Cl.
CPC ............ *H01Q 15/148* (2013.01); *H01Q 1/38* (2013.01); *H01Q 5/50* (2015.01)

(58) Field of Classification Search
CPC ........... H01Q 15/148; H01Q 1/38; H01Q 5/50
See application file for complete search history.

(56) References Cited

U.S. PATENT DOCUMENTS

2023/0129840 A1* 4/2023 Gharbieh ............. H01Q 9/0414
2025/0219289 A1* 7/2025 Singh ......................... H01P 1/15

* cited by examiner

*Primary Examiner* — David E Lotter
(74) *Attorney, Agent, or Firm* — Bayramoglu Law Offices LLC

(57) ABSTRACT

The provided is a germanium telluride-based reflectarray element and millimeter-wave frequency-reconfigurable reflectarray antenna. The reflectarray antenna includes a plurality of reflectarray elements, a dielectric substrate, a metal ground, and a feed source, where the reflectarray element is located on an upper surface of the dielectric substrate, and includes a loop body and two phase delay lines; two first germanium telluride films are embedded in the loop body to divide the loop body into two parts with equal lengths; each part of the loop body is connected to a middle portion of one phase delay line; two second germanium telluride films are embedded in the phase delay line; the two second germanium telluride films are symmetrically distributed up and down with the middle portion of the phase delay line as a center.

10 Claims, 8 Drawing Sheets

GERMANIUM TELLURIDE-BASED REFLECTARRAY ELEMENT AND MILLIMETER-WAVE FREQUENCY-RECONFIGURABLE REFLECTARRAY ANTENNA

CROSS-REFERENCE TO THE RELATED APPLICATIONS

This application is based upon and claims priority to Chinese Patent Application No. 202411745264.X, filed on Dec. 2, 2024, the entire contents of which are incorporated herein by reference.

TECHNICAL FIELD

The present disclosure belongs to the technical field of reflectarray antennas, and in particular relates to a germanium telluride-based reflectarray element and millimeter-wave frequency-reconfigurable reflectarray antenna.

BACKGROUND

Millimeter-wave communication has attracted widespread attention due to its ultra-wide bandwidth and high data transmission rates. For long-distance wireless communication systems, antennas must combine high gain with wide bandwidth. As a novel high-gain antenna, planar reflect arrays integrate the advantages of parabolic antennas and array antennas. By rationally designing the reflection phase of each reflector element on the array, specific high-gain beam pointing can be achieved.

Additionally, to accommodate more radiofrequency (RF) transceiver channels, multi-band reconfigurable antennas have become promising solutions for implementing multi-functional communication systems. Reconfigurable characteristics can be realized within a single aperture through switching state control according to different application scenarios. Traditional RF switches like positive-intrinsic-negative (PIN) diodes and varactors exhibit advantages such as fast switching speed and compact size. However, most of them operate at low frequencies and suffer from high loss and low isolation in millimeter-wave bands. In contrast, germanium telluride, as a common phase-change material, ensures lower loss and higher isolation in millimeter-wave bands while maintaining good integration with RF devices under low driving voltages. Nevertheless, current germanium telluride-based multifunctional antennas are still limited to integration with simple patch and slot antennas, exhibiting constrained control methods and failing to fully exploit germanium telluride's advantages. Therefore, germanium telluride-based millimeter-wave multi-band reconfigurable reflectarray antennas urgently require further research and technological breakthroughs.

SUMMARY

To address the aforementioned existing deficiencies, a technical problem to be solved by the present disclosure is to provide a germanium telluride-based reflectarray element and millimeter-wave frequency-reconfigurable reflectarray antenna. The germanium telluride-based reflectarray element of the present disclosure achieves dual-band switching while maintaining high phase compensation accuracy and low element loss across two frequency bands. The millimeter-wave frequency-reconfigurable reflectarray antenna designed using the reflectarray element can achieve high-gain focused beams in both frequency bands. The present disclosure exhibits high aperture efficiency, wide gain bandwidth, and low cross-polarization, with flexible element phase adjustment and high design flexibility, making it particularly suitable for multi-band reflectarray antenna design. Therefore, the present disclosure can be effectively applied to design high-gain multi-band reflectarray devices in millimeter-wave and terahertz bands while facilitating mass production.

To achieve the above objective, the present disclosure adopts the following technical solutions:

A germanium telluride-based reflectarray element includes a loop body and two phase delay lines, where two first germanium telluride films are embedded in the loop body to divide the loop body into two parts with equal lengths; each part of the loop body is connected to a middle portion of one phase delay line; two second germanium telluride films are embedded in the phase delay line; the two second germanium telluride films are symmetrically distributed up and down with the middle portion of the phase delay line as a center; and the first germanium telluride films and the second germanium telluride films are metallic or insulated to change a length of the loop body and adjust a frequency of a reflectarray element, or change a length of the phase delay line and adjust a phase of the reflectarray element, with the frequency and phase adjustments being independent of each other.

In order to optimize the above technical solution, the specific measures implemented further include:

The germanium telluride-based reflectarray element further includes a dielectric substrate and a metal ground, where the loop body and the phase delay lines are connected to an upper surface of the dielectric substrate; and a lower surface of the dielectric substrate is connected to the metal ground.

The first germanium telluride films and the second germanium telluride films are interdigital germanium telluride films.

The loop body is a polygonal loop body or a circular loop; and the phase delay lines are straight lines, folded lines or curved lines.

The loop body, the phase delay lines, and a metal ground are made of gold, silver or copper; and a dielectric substrate is a low-temperature co-fired ceramic (LTCC) substrate, a printed circuit board (PCB), or a quartz glass substrate.

A germanium telluride-based millimeter-wave frequency-reconfigurable reflectarray antenna includes a plurality of reflectarray elements and a feed source, where the reflectarray elements form a reflectarray according to a phase distribution; the feed source is located close to the reflectarray to feed the reflectarray; and the reflectarray is configured to focus an electromagnetic wave, thereby achieving broadband high-gain performance for the electromagnetic wave.

The reflectarray element corresponds to different desired phases at different frequencies; the phase delay lines of the reflectarray element with different phases have different lengths; the desired phase of the reflectarray element at different frequencies is calculated as follows:

$$\varphi_{f1}(x_i,y_i)=k_0(R_{i\_f1}-\sin\theta_0(\cos\varphi_0 x_i+\sin\varphi_0 y_i)$$

where, f1 denotes a frequency of the reflectarray element, $(\theta_0,\varphi_0)$ denotes a direction of a main beam formed by reflection, $(x_i,y_i)$ denotes position coordinates of the reflectarray element, $k_0$ denotes a free-space wavenumber at the frequency, and $R_{i\_f1}$ denotes a distance between a phase center of the feed source and i-th reflectarray element at the frequency f1; the distance between the feed source and the reflectarray element varies across different frequencies; and the length of the phase delay line of the reflectarray element is set according to $\varphi_{f1}(x_i,y_i)$.

When the first germanium telluride films of the reflectarray element are metallic or insulated, the loop body has two different frequencies; the two frequencies correspond to two desired phases, and specifically correspond to two lengths of the phase delay lines; and assuming that a longer length is defined as a and a shorter length is defined as b, then a total length of the phase delay line of the reflectarray element is a, while a length of the phase delay line between the two second germanium telluride films is b.

The feed source is a horn, a dipole antenna, or a patch antenna, and operates with vertical incidence or oblique incidence.

When the length of the phase delay line is greater than a length of the dielectric substrate, the phase delay line is folded.

The present disclosure has the following beneficial effects:

(1) In the germanium telluride-based reflectarray element proposed in the present disclosure, smooth coverage of 0-360° reflection phase variation ranges in two frequency bands is realized by loading phase delay lines with frequency-adaptive lengths on the loop body. Additionally, the first germanium telluride film is disposed on the loop body, and the second germanium telluride film is embedded in the phase delay line. Independent precise control of frequencies and compensation phases and low element reflection loss (below 0.5 dB in millimeter-wave bands) are achieved by altering states (metallic or insulated) of the germanium telluride at both positions.

(2) Compared with conventional dual-band reconfigurable reflectarray antenna elements, the germanium telluride-based reflectarray element proposed in the present disclosure features simpler structure, easier control, and larger frequency tuning ratio, enabling arbitrary compensation phase switching.

(3) The germanium telluride-based reflectarray element proposed in the present disclosure significantly enhances design flexibility, being realizable through a single-layer structure, thereby enabling diversified configurations of the germanium telluride-based frequency-reconfigurable reflectarray.

(4) Owing to the low reflection loss and broadband characteristics of the germanium telluride-based reflectarray element, the germanium telluride-based millimeter-wave frequency-reconfigurable reflectarray antenna proposed in the present disclosure demonstrates high aperture efficiency.

(5) The germanium telluride-based reflectarray element and the millimeter-wave frequency-reconfigurable reflectarray antenna proposed in the present disclosure exhibit simple structures and low array profile characteristics, facilitating mass production and wide applications in reflectarray antenna design for millimeter-wave and terahertz bands.

Figure 1:
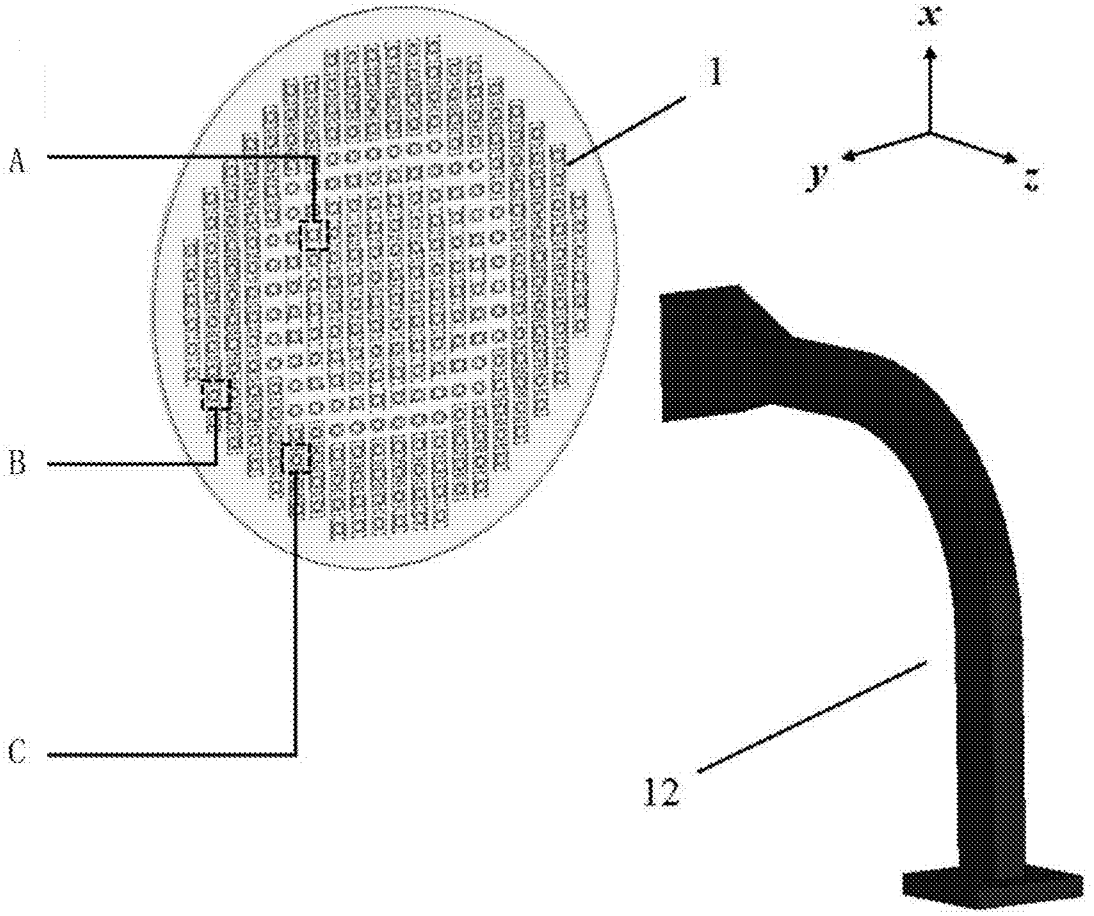
FIG. 1 is a three-dimensional schematic diagram of a germanium telluride-based millimeter-wave frequency-reconfigurable reflectarray antenna in the present disclosure.

Reference Numerals: 1. reflectarray antenna; 2. reflectarray element; 3. dielectric substrate; 4. metal ground; 5. loop body; 6. phase delay line; 7. first germanium telluride film; 8. second germanium telluride film; 9. first-section delay line reflectarray element; 10. second-section delay line reflectarray element; 11. third-section delay line reflectarray element; and 12. feed horn.

DETAILED DESCRIPTION OF THE EMBODIMENTS

To make the objectives, technical solutions, and advantages of the present disclosure clearer, the present disclosure is described below with reference to the drawings and embodiments. It should be understood that the specific embodiments described herein are merely intended to explain the present disclosure, rather than to limit the present application. All other embodiments obtained by those of ordinary skill in the art based on the embodiments of the present disclosure without creative efforts should fall within the protection scope of the present disclosure.

Apparently, the drawings in the following description show merely some embodiments of the present disclosure, and a person of ordinary skill in the art may apply the present disclosure to other similar scenarios according to these drawings without creative efforts. In addition, it can also be appreciated that, although it may take enduring and complex efforts to achieve such a development process, for those of ordinary skill in the art related to the present disclosure, some changes such as design, manufacturing or production made based on the technical content in the present disclosure are merely regular technical means, and should not be construed as insufficiency of the present disclosure.

The "embodiment" mentioned in the present disclosure means that a specific feature, structure, or characteristic described in combination with the embodiment may be included in at least one embodiment of the present disclosure. The phrase appearing in different parts of the specification does not necessarily refer to the same embodiment or an independent or alternative embodiment exclusive of other embodiments. It may be explicitly or implicitly appreciated by those of ordinary skill in the art that the embodiments of the present disclosure may be combined with other embodiments as long as no conflict occurs.

Unless otherwise defined, the technical or scientific terms used in the present disclosure are as they are usually understood by those of ordinary skill in the art to which the present disclosure pertains. In the present disclosure, the terms "one", "a", "the" and similar words are not meant to be limiting, and may represent a singular form or a plural form. The terms "include", "contain", "have" and any other variants in the present disclosure mean to cover the non-exclusive inclusion, for example, a process, method, system, product, or device that includes a series of steps or modules (units) is not necessarily limited to those steps or units which are clearly listed, but may include other steps or units which are not expressly listed or inherent to such a process, method, system, product, or device. "Connected", "interconnected", "coupled" and similar words in the present disclosure are not restricted to physical or mechanical connections, but may include electrical connections, whether direct or indirect. The term "a plurality of" in the present disclosure means two or more. The term "and/or" describes associations between associated objects, and it indicates three types of relationships. For example, "A and/or B" may indicate that A exists alone, A and B coexist, or B exists alone. The character "/" usually indicates an "or" relationship between associated objects. The terms "first", "second", "third" and so on in the present disclosure are intended to distinguish between similar objects but do not necessarily indicate a specific order of the objects.

As shown in FIG. 1 and FIGS. 9 to 11, germanium telluride-based millimeter-wave frequency-reconfigurable reflectarray antenna 1 includes a plurality of germanium telluride-based reflectarray elements 2, dielectric substrate 3, metal ground 4, and bent feed horn 12.

Figure 2:
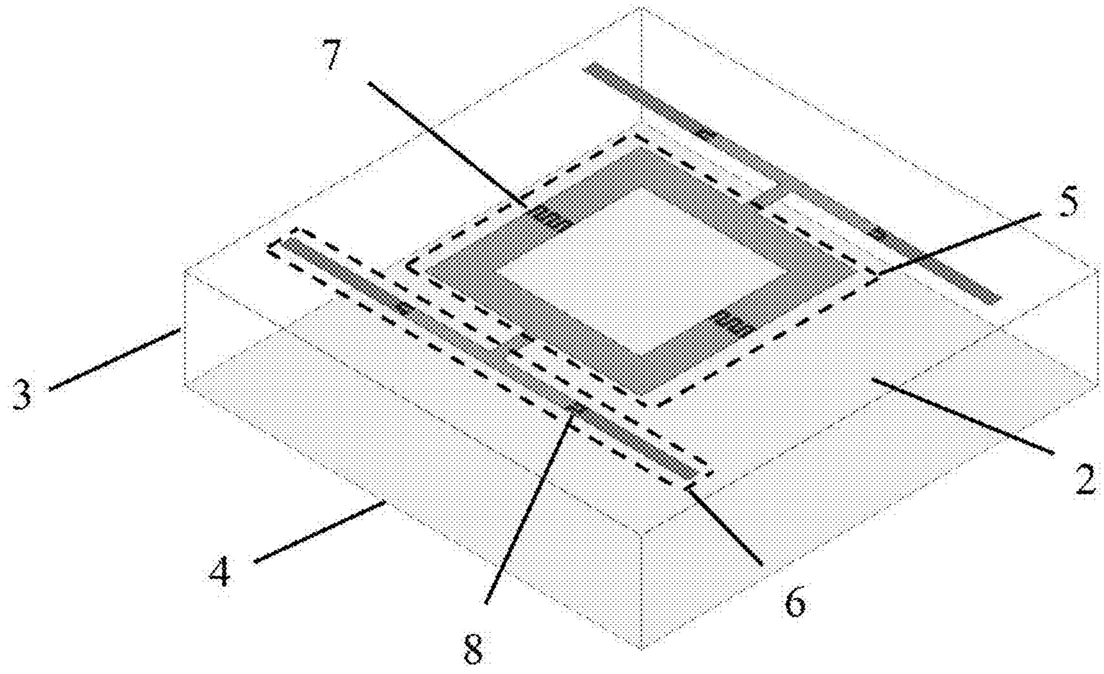
FIG. 2 is a three-dimensional structural schematic diagram of a germanium telluride-based reflectarray element (a first-section delay line reflectarray element) in Embodiment 1 of the present disclosure.

As shown in FIG. 2, the reflectarray element 2 is located on an upper surface of the dielectric substrate 3, and includes square loop body 5 and a pair of phase delay lines 6. The phase delay lines 6 are symmetrically loaded at two sides of the square loop body 5. A pair of interdigital first germanium telluride films 7 for frequency adjustment is symmetrically embedded at two sides of the square loop body 5 without loaded delay lines. Two pairs of interdigital second germanium telluride films 8 for phase adjustment are symmetrically embedded in the phase delay lines 6. The metal ground 4 is disposed on a lower surface of the dielectric substrate 3. The germanium telluride-based reflectarray elements 2 constitute the germanium telluride-based millimeter-wave frequency-reconfigurable reflectarray antenna 1 according to a phase distribution. The bent feed horn 12 is placed directly above the reflectarray for feeding, such that broadband high-gain performance is realized after an electromagnetic wave radiated is focused by the reflectarray antenna.

Phase distributions of the reflectarray surface differ across different frequencies, and different phases determine different lengths of phase delay lines. The phase delay lines with different lengths are folded according to practical requirements due to limited size of the dielectric substrate 3, forming first-section delay line reflectarray element 9, second-section delay line reflectarray element 10, and third-section delay line reflectarray element 11.

When the first germanium telluride films 7 of the reflectarray element 2 are metallic or insulated, the loop body 5 operates at two distinct frequencies. These frequencies correspond to two desired phases, i.e., two lengths of the phase delay lines 6. Let a longer length be a and a shorter length be b. The total length of the phase delay line 6 in the reflectarray element 2 is a, and the length of the phase delay line 6 between the two second germanium telluride films 8 is b. Excitation of the germanium telluride films at specific positions is achieved by an excimer pulsed laser and a photomask. Therefore, based on the simple structure of the square loop body 5 loaded with the phase delay lines 6, dual-band flexible control is realized by embedding the germanium telluride films and switching their states. Smooth 0-360° reflection phase coverage across the two frequency bands is achieved with a loss below 0.5 dB.

The reflectarray antenna 1 includes a plurality of germanium telluride-based reflectarray elements 2 arranged according to a reflectarray compensation phase distribution. To convert an incident spherical wave into a planar wave, the desired reflection phase for each reflectarray element 2 on the reflectarray antenna 1 at different frequencies is calculated as follows:

$$\varphi_{f1}(x_i,y_i)=k_0(R_{i\_f1}-\sin\theta_0(\cos\varphi_0 x_i+\sin\varphi_0 y_i)$$

f1 denotes a frequency of the reflectarray element 2, $(\theta_0,\varphi_0)$ denotes a direction of a main beam formed by reflection, $(x_i,y_i)$ denotes position coordinates of the reflectarray element 2, $k_0$ denotes a free-space wavenumber at the frequency, and $R_{i\_f1}$ denotes a distance between a phase center of the feed source and i-th reflectarray element 2 at the frequency f1. The distance between the feed source and the reflectarray element 2 varies across different frequencies.

The feeding method of the feed source for the germanium telluride-based millimeter-wave frequency-reconfigurable reflectarray antenna 1 is not limited to the feed horn or vertical incidence. When other feed types adopt oblique incidence feeding, the germanium telluride-based millimeter-wave frequency-reconfigurable reflectarray antenna composed of the reflectarray elements in the present disclosure still maintains excellent performance.

The dielectric substrate 3 adopted by the reflectarray element 2 includes but is not limited to a low-temperature co-fired ceramic (LTCC) substrate, a printed circuit board (PCB), or quartz glass, etc.

Specific embodiments are described below to explain the structure of the present disclosure.

Embodiment 1: Reflectarray Element 2

Figure 3:
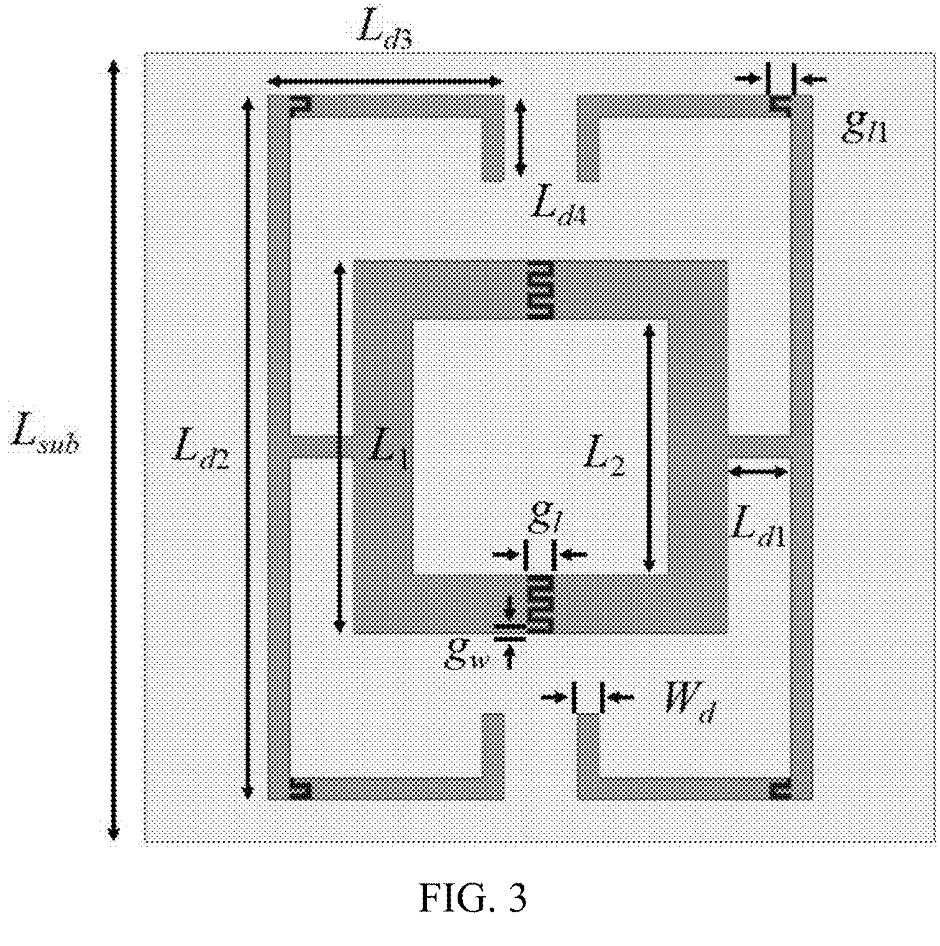
FIG. 3 is a top-view structural schematic diagram of a germanium telluride-based reflectarray element (a third-section delay line reflectarray element) in Embodiment 1 of the present disclosure; where $g_n$ denotes a width of a second germanium telluride film, and $W_d$ denotes a width of each delay line.

FIGS. 2 and 3 show the third-section delay line reflectarray element 11. The dielectric substrate 3 has side length $L_{sub}$ of [0.1λ,0.8λ] and thickness $H_{sub}$ of [0.01λ,0.5λ]. The loop body 5 has outer side length $L_1$ of [0.05λ,0.5λ] and inner side length $L_2$ of [0.01λ,0.42]. A connection segment between the loop body 5 and the phase delay line 6 has length $L_{d1}$ of [0.01λ,0.2λ]. The first-section delay line has length $L_{d2}$ of [0.05λ,0.5λ], the second-section delay line has length $L_{d3}$ of [0.05λ,0.5λ], and the third-section delay line has length $L_{d4}$ of [0.05λ,0.5λ], and the interdigital first germanium telluride film 7 has width $g_w$ of [0.001λ,0.1λ] and length gi of [0.005λ,0.1λ].

In this embodiment, the specific lengths of the phase delay lines 6 and the positions of the second germanium telluride films 8 for phase adjustment in the reflectarray element 2 are determined by desired phase values of the reflectarray element 2 at the two frequencies calculated from the reflection phases. The lengths of the phase delay lines differ across different frequencies.

In this embodiment, the shapes of the loop body 5 and the phase delay lines 6 may vary to further enhance reflection phase adjustment dimensions and achieve better design flexibility.

In this embodiment, the reflectarray element 2 has the following specific dimensions:

The dielectric substrate has side length $L_{sub}$ of 3.7 mm and thickness $H_{sub}$ of 0.8 mm, the loop body 5 has outer side length $L_1$ of 1.75 mm and inner side length $L_2$ of 1.2 mm, the connection segment between the loop body 5 and the phase delay line has length $L_{d1}$ of 0.3 mm, the first-section delay line has length $L_{d2}$ of [0.3,3.3] mm, the second-section delay line has length $L_{d3}$ of [3.4,4.4] mm, the third-section delay line has length $L_{d4}$ of [4.5,5] mm, and the interdigital first germanium telluride film 7 has width $g_w$ of 0.025 mm and length $g_l$ of 0.125 mm.

In the above embodiment, the reflectarray element 2 is fabricated using micro-nano processing. Germanium telluride is deposited via magnetron sputtering, and the dielectric substrate is quartz glass. The dielectric substrate has permittivity $\varepsilon_r$ of 3.78 and a metal thickness of [0.005λ,0.1λ], and the germanium telluride film has a thickness of [0.005λ, 0.1λ], where λ denotes the free-space wavelength. These parameters correspond to dimensions at a low-frequency center frequency of 28 GHz.

Embodiment 2 Germanium Telluride-Based Millimeter-Wave Frequency-Reconfigurable Reflectarray Antenna In this embodiment, as shown in FIG. 1 and FIGS. 9 to 11, in the overall structural diagram of the reflectarray antenna 1 and the feed horn 12, an X-axis direction of the dielectric substrate 3 is vertical, and a Y-axis direction thereof is horizontal, with an element origin being a center point of the dielectric substrate 3. The X and Y coordinate system directions mentioned in this embodiment are defined according to the drawings.

Figure 4:
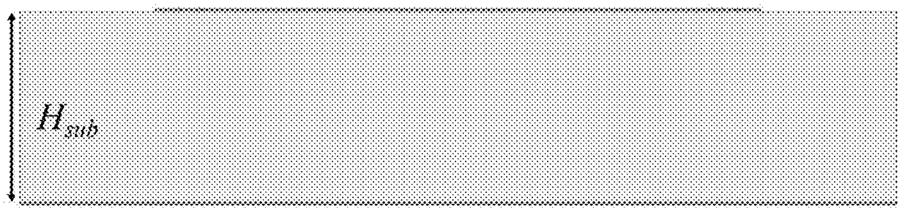
FIG. 4 is a side-view structural schematic diagram of the germanium telluride-based reflectarray element in Embodiment 1 of the present disclosure.
Figure 5:
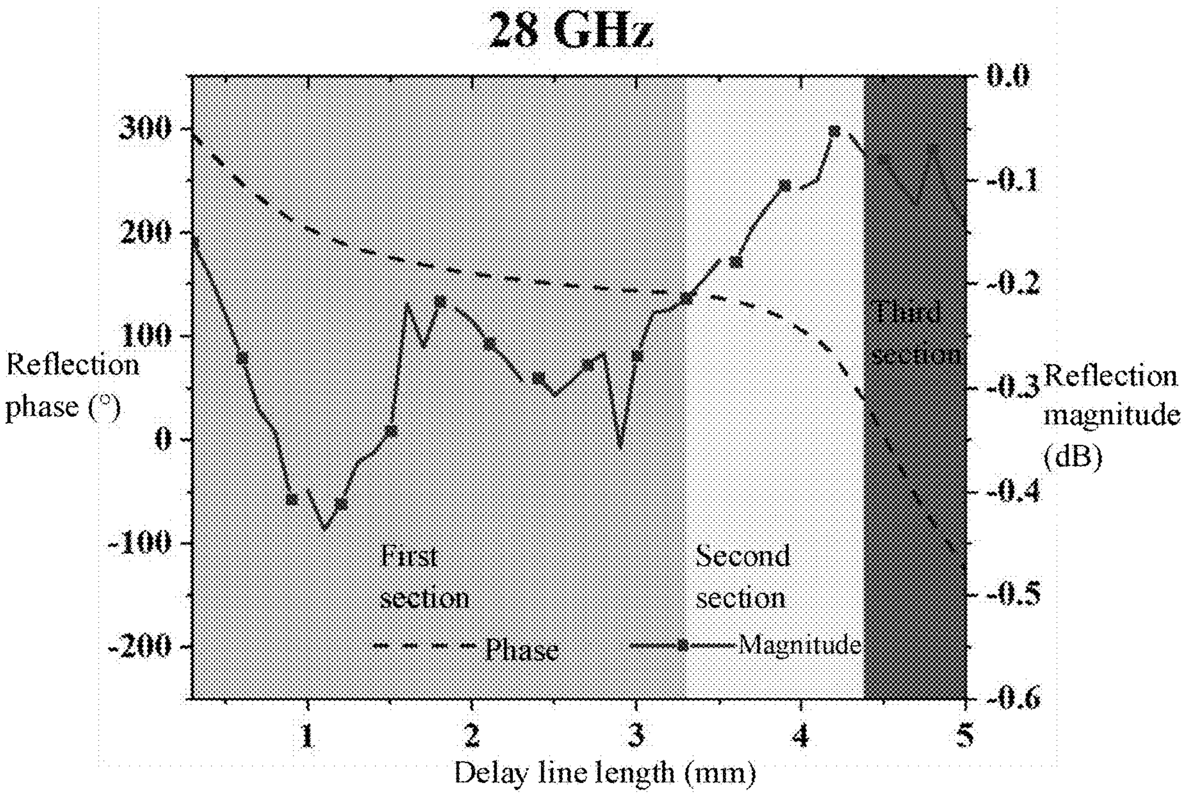
FIG. 5 shows an amplitude and phase characteristic curve of the germanium telluride-based reflectarray element when a first germanium telluride film is in a metallic state in the present disclosure.

As shown in FIGS. 4 and 5, the center operating frequencies of the reflectarray element 2 are 28 GHz and 38 GHz when the first germanium telluride films 7 are in the metallic state and insulated state, respectively. The reflection phase curves at both frequencies smoothly cover 0-360°, and the element reflection loss is below 0.5 dB. This indicates that the reflectarray element 2 of the present disclosure effectively reduces reflection loss and enables high aperture efficiency of the germanium telluride-based frequency-reconfigurable reflectarray antenna.

Figure 6:
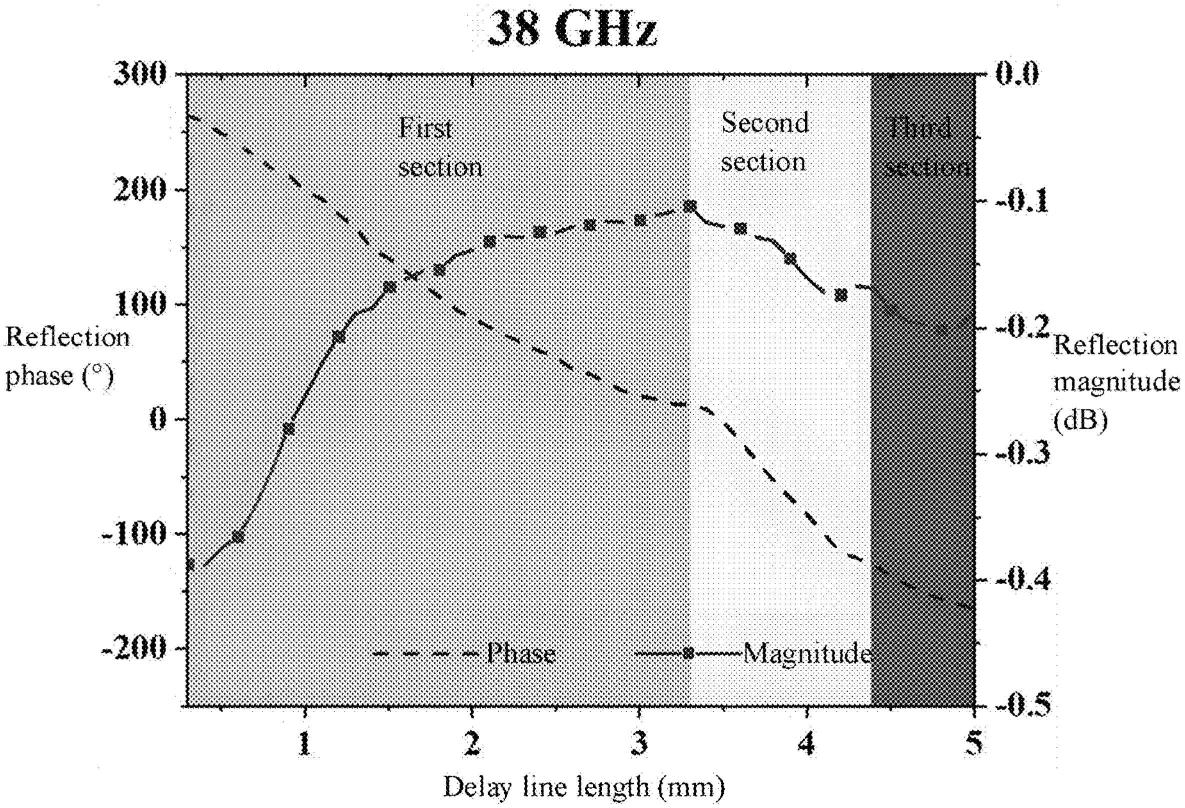
FIG. 6 shows an amplitude and phase characteristic curve of the germanium telluride-based reflectarray element when the first germanium telluride film is in an insulated state in the present disclosure.
Figure 7:
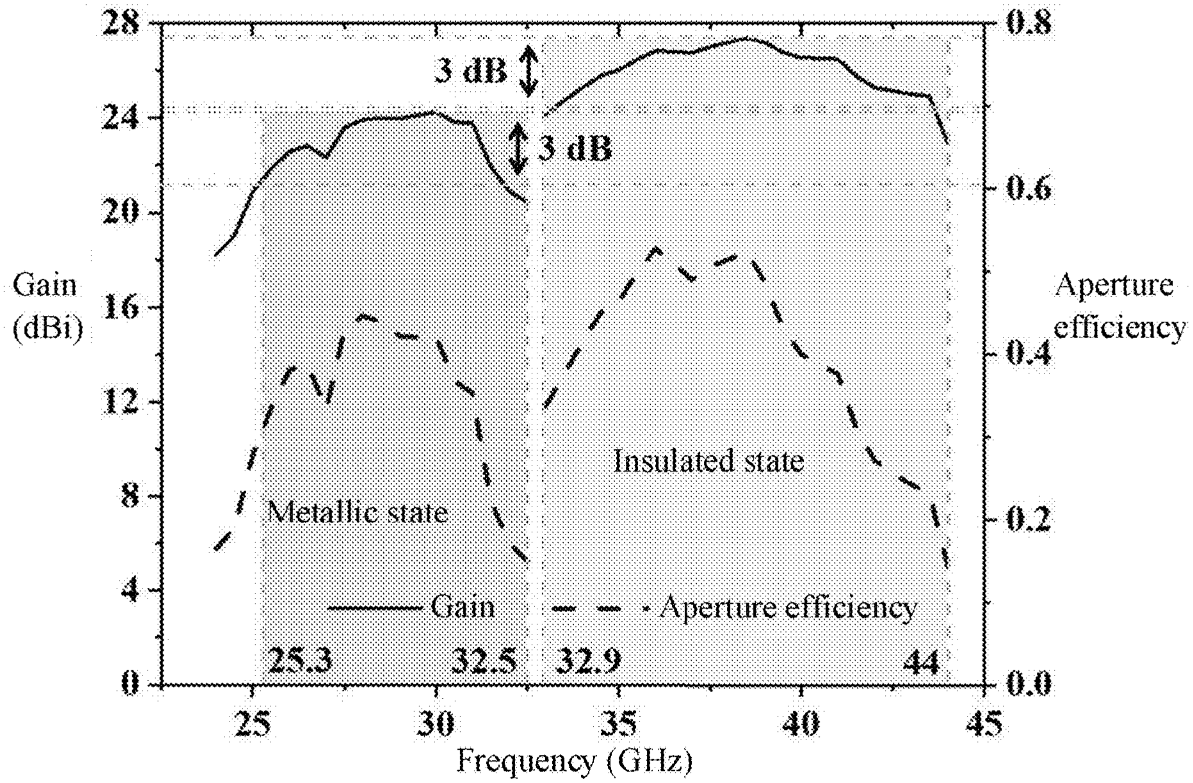
FIG. 7 shows a gain and aperture efficiency of the germanium telluride-based millimeter-wave frequency-reconfigurable reflectarray antenna in two frequency bands in the present disclosure.
Figure 8:
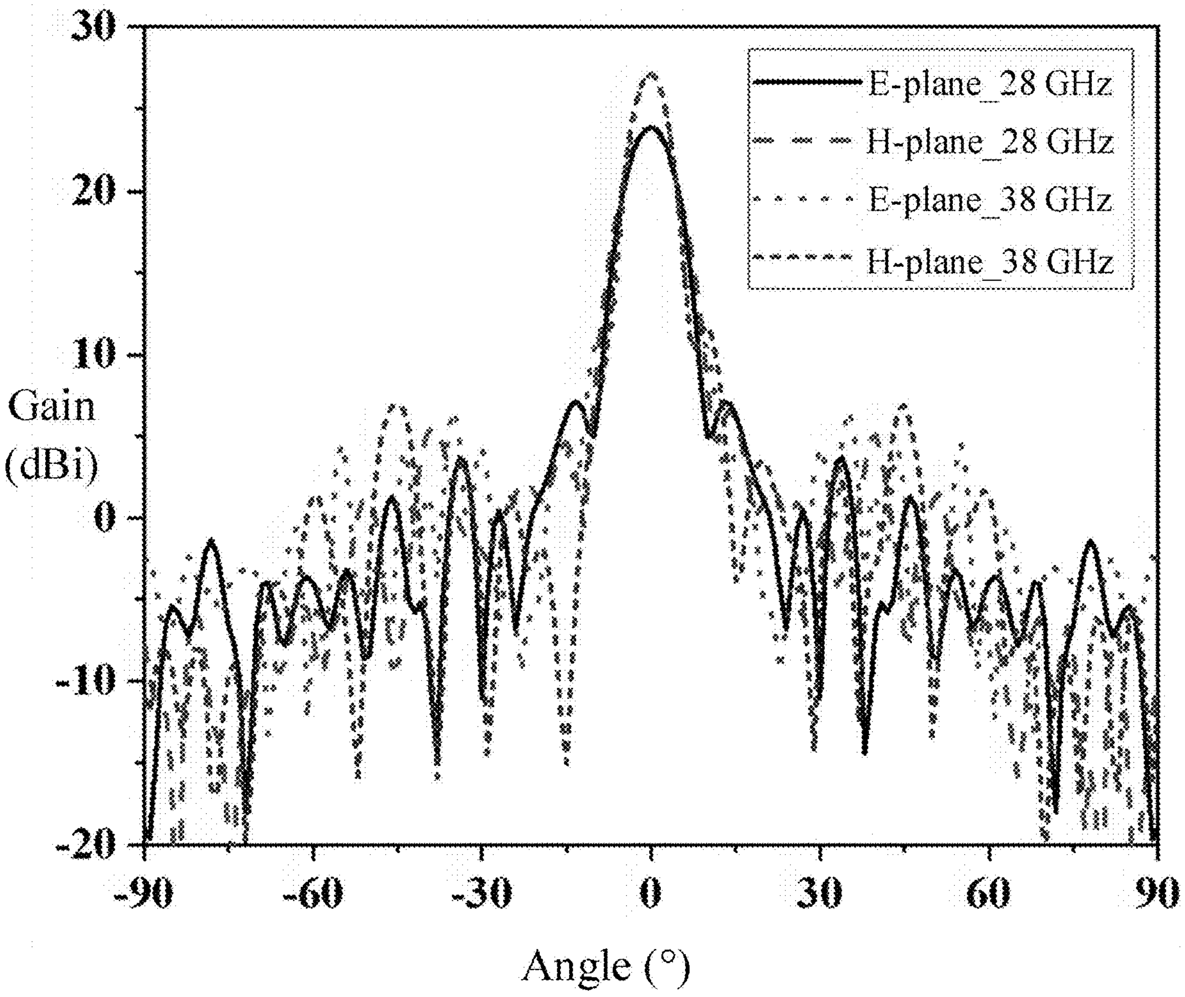
FIG. 8 is E-plane and H-plane radiation patterns of the germanium telluride-based millimeter-wave frequency-reconfigurable reflectarray antenna in the two frequency bands in the present disclosure.
Figure 9:
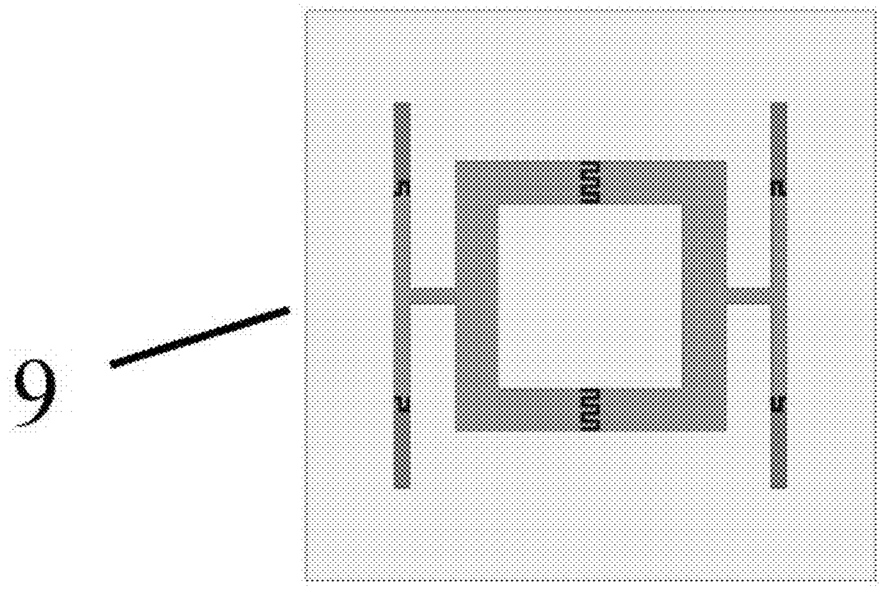
FIG. 9 is an enlarged view of A shown in FIG. 1.
Figure 10:
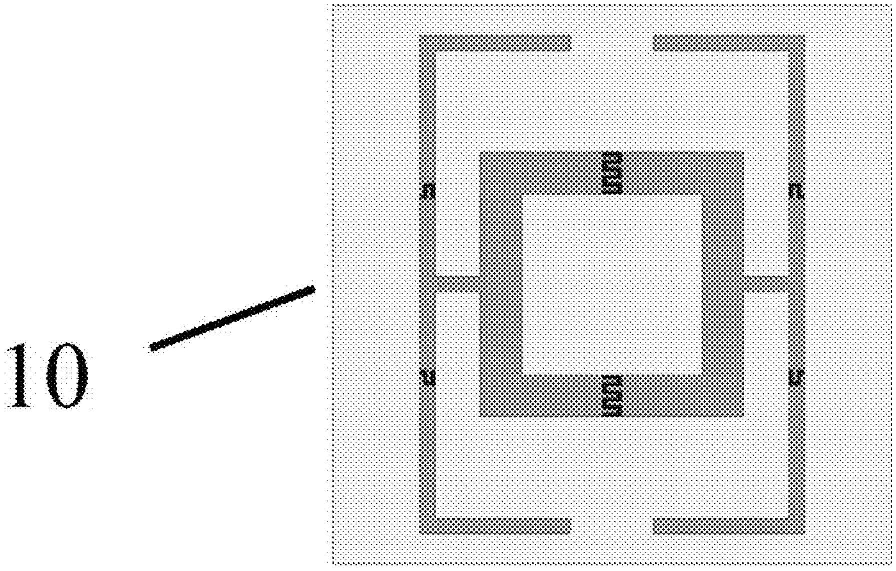
FIG. 10 is an enlarged view of B shown in FIG. 1.
Figure 11:
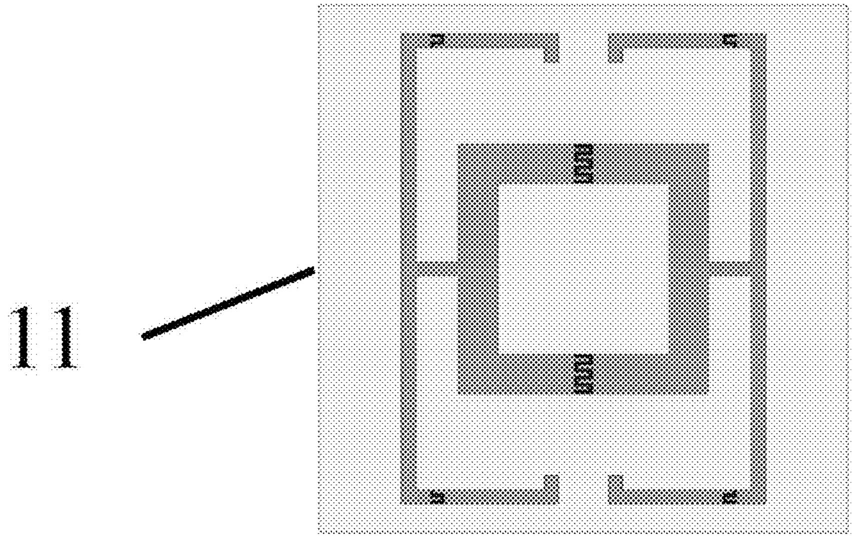
FIG. 11 is an enlarged view of C shown in FIG. 1.

As shown in FIGS. 6 and 7, the aperture area of the germanium telluride-based millimeter-wave frequency-reconfigurable reflectarray antenna 1 is 5541.77 $mm^2$. The heights of the feed horn 12 at 28 GHz and 38 GHz are 44 mm and 72 mm, corresponding to focal-to-diameter ratios of 0.53 and 0.86, respectively. The low-frequency peak gain is 24.24 dBi with an aperture efficiency of 44.7%, and the 3-dB and 1-dB gain bandwidths are 23.16% (25.2-31.8 GHZ) and 12.65% (27.4-31.1 GHZ), respectively. The high-frequency peak gain is 27.37 dBi with an aperture efficiency of 52.8%, and the 3-dB and 1-dB gain bandwidths are 27.08% (33.2-43.6 GHz) and 14.9% (35.4-41.1 GHz), respectively. The E/H-plane radiation patterns show good consistency, achieving high gain and high aperture efficiency of the reflectarray in the millimeter-wave bands.

The above results demonstrate that the germanium telluride-based millimeter-wave frequency-reconfigurable reflectarray antenna 1 of the present disclosure achieves high aperture efficiency in both millimeter-wave bands. The present disclosure proposes a germanium telluride-based phase-frequency decoupled tuning mechanism. Excitation of the germanium telluride at specific positions is realized through the excimer pulsed laser and photomask, significantly enhancing design flexibility.

The above embodiments are preferred implementations of the present disclosure, but the implementations of the present disclosure are not limited to these embodiments, and any other changes, modifications, substitutions, combinations, and simplifications made without departing from the spirit and principle of the present disclosure should be deemed as equivalent replacements, and shall be included in the protection scope of the present disclosure.

What is claimed is:

1. A germanium telluride-based reflectarray element, comprising a loop body and two phase delay lines, wherein two first germanium telluride films are embedded in the loop body to divide the loop body into two parts with equal lengths; each part of the loop body is connected to a middle portion of one phase delay line; two second germanium telluride films are embedded in the phase delay line; the two second germanium telluride films are symmetrically distributed up and down with the middle portion of the phase delay line as a center; and the first germanium telluride films and the second germanium telluride films are metallic or insulated to change a length of the loop body and adjust a frequency of a reflectarray element, or change a length of the phase delay line and adjust a phase of the reflectarray element, with frequency and phase adjustments being independent of each other.

2. The germanium telluride-based reflectarray element according to claim 1, further comprising a dielectric substrate and a metal ground, wherein the loop body and the phase delay lines are connected to an upper surface of the dielectric substrate; and a lower surface of the dielectric substrate is connected to the metal ground.

3. The germanium telluride-based reflectarray element according to claim 1, wherein the first germanium telluride films and the second germanium telluride films are interdigital germanium telluride films.

4. The germanium telluride-based reflectarray element according to claim 1, wherein the loop body is a polygonal loop body or a circular loop; and the phase delay lines are straight lines, folded lines or curved lines.

5. The germanium telluride-based reflectarray element according to claim 1, wherein the loop body, the phase delay lines, and a metal ground are made of gold, silver or copper; and a dielectric substrate is a low-temperature co-fired ceramic (LTCC) substrate, a printed circuit board (PCB), or a quartz glass substrate.

6. A germanium telluride-based millimeter-wave frequency-reconfigurable reflectarray antenna, comprising a plurality of the reflectarray elements according to claim 2 and a feed source, wherein the reflectarray elements form a reflectarray according to a phase distribution; the feed source is located adjacent to the reflectarray to feed the reflectarray; and the reflectarray is configured to focus an electromagnetic wave, thereby achieving broadband high-gain performance for the electromagnetic wave.

7. The germanium telluride-based millimeter-wave frequency-reconfigurable reflectarray antenna according to claim 6, wherein the reflectarray element corresponds to different desired phases at different frequencies; the phase delay lines of the reflectarray element with different phases have different lengths; the desired phase of the reflectarray element at different frequencies is calculated as follows:

$$\varphi_{f1}(x_i,y_i)=k_0(R_{i\_f1}-\sin\theta_0(\cos\varphi_0 x_i+\sin\varphi_0 y_i)$$

wherein f1 denotes a frequency of the reflectarray element, $(\theta_0,\varphi_0)$ denotes a direction of a main beam formed by reflection, $(x_i,y_i)$ denotes position coordinates of the reflectarray element, $k_0$ denotes a free-space wavenumber at the frequency, and $R_{i\_f1}$ denotes a distance between a phase center of the feed source and i-th reflectarray element at the frequency f1; the distance between the feed source and the reflectarray element varies across different frequencies; and the length of the phase delay line of the reflectarray element is set according to $\varphi_{f1}(x_i,y_i)$.

8. The germanium telluride-based millimeter-wave frequency-reconfigurable reflectarray antenna according to claim 7, wherein when the first germanium telluride films of the reflectarray element are metallic or insulated, the loop body has two different frequencies; the two different frequencies correspond to two desired phases, and correspond to two lengths of the phase delay lines; and assuming that a longer length is defined as a and a shorter length is defined as b, a total length of the phase delay line of the reflectarray element is a, while a length of the phase delay line between the two second germanium telluride films is b.

9. The germanium telluride-based millimeter-wave frequency-reconfigurable reflectarray antenna according to claim 6, wherein the feed source is a horn, a dipole antenna, or a patch antenna, and operates with vertical incidence or oblique incidence.

10. The germanium telluride-based millimeter-wave frequency-reconfigurable reflectarray antenna according to claim 7, wherein when the length of the phase delay line is greater than a length of the dielectric substrate, the phase delay line is folded.

* * * * *